US010212651B2

(12) United States Patent
Gulati et al.

(10) Patent No.: US 10,212,651 B2
(45) Date of Patent: Feb. 19, 2019

(54) SYSTEMS, METHODS, AND DEVICES FOR LINK QUALITY BASED RELAY SELECTION

(71) Applicant: QUALCOMM Incorporated, San Diego, CA (US)

(72) Inventors: Kapil Gulati, Franklin Park, NJ (US); Saurabha Rangrao Tavildar, Jersey City, NJ (US); Sudhir Kumar Baghel, Bridgewater, NJ (US); Shailesh Patil, Raritan, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 15/086,814

(22) Filed: Mar. 31, 2016

(65) Prior Publication Data

US 2016/0337954 A1 Nov. 17, 2016

Related U.S. Application Data

(60) Provisional application No. 62/161,874, filed on May 14, 2015.

(51) Int. Cl.
*H04B 7/14* (2006.01)
*H04W 48/00* (2009.01)
(Continued)

(52) U.S. Cl.
CPC ............ *H04W 48/17* (2013.01); *H04B 7/155* (2013.01); *H04W 24/10* (2013.01); *H04W 76/14* (2018.02);
(Continued)

(58) Field of Classification Search
CPC ... H04W 48/17; H04W 24/10; H04W 76/023; H04W 48/12; H04W 88/04; H04W 8/005; H04B 7/155
See application file for complete search history.

(56) References Cited

U.S. PATENT DOCUMENTS

| | | | | |
|---|---|---|---|---|
| 2008/0108369 A1* | 5/2008 | Visotsky | H04B 7/2606 | 455/455 |
| 2014/0171062 A1* | 6/2014 | Fallgren | H04W 40/22 | 455/422.1 |
| 2016/0037568 A1* | 2/2016 | Hakola | H04W 8/005 | 370/329 |

FOREIGN PATENT DOCUMENTS

WO 2014153770 A1 10/2014

OTHER PUBLICATIONS

International Search Report and Written Opinion—PCT/US2016/025686—ISA/EPO—dated Jun. 27, 2016.

(Continued)

*Primary Examiner* — Clemence S Han
(74) *Attorney, Agent, or Firm* — Arent Fox, LLP

(57) ABSTRACT

A method, an apparatus, and a computer program product for wireless communication are provided. The apparatus determines a first link quality. The first link quality indicates a link quality of a first link between a first potential relay UE and the remote UE. The apparatus determines a second link quality. The second link quality indicates a link quality of a second link between the first potential relay UE and a first base station. The apparatus ranks the first potential relay UE relative to a second potential relay UE. The ranking of the first potential relay UE is based on a combination of the first link quality and the second link quality. The apparatus selects one of the first potential relay UE and the second potential relay UE for a relay connection based on the ranking of the first potential relay UE relative to the second potential relay UE.

41 Claims, 10 Drawing Sheets

500
502
Uu_1
Uu_2
504
506
510
Relay UE1
Relay UE2
PC5_1
PC5_2
508
Remote UE

(51) Int. Cl.

| | |
|---|---|
| ***H04W 76/14*** | (2018.01) |
| ***H04B 7/155*** | (2006.01) |
| ***H04W 24/10*** | (2009.01) |
| *H04W 8/00* | (2009.01) |
| *H04W 88/04* | (2009.01) |
| *H04W 48/12* | (2009.01) |
| *H04W 40/12* | (2009.01) |

(52) U.S. Cl.

CPC ........... *H04W 8/005* (2013.01); *H04W 40/12* (2013.01); *H04W 48/12* (2013.01); *H04W 88/04* (2013.01)

(56) References Cited

OTHER PUBLICATIONS

Qualcomm Incorporated: "Network coverage using L3-based UE-to-Network Relays", 3GPP Draft, R2-151510-UE to NW Relay V1, 3rd Generation Partnership Project (3GPP), Mobile Competence Centre, 650, Route Des Lucioles, F-06921 Sophia-Antipolis Cedex, France, vol. RAN WG2, no. Bratislava, Slovakia, Apr. 20, 2015-Apr. 24, 2015, Apr. 19, 2015 (Apr. 19, 2015), 6 Pages, XP050936432, Retrieved from the Internet: URL: http://www.3gpp.org/ftp/Meetings_3GPP _SYNC/RAN2/Docs/ [retrieved on Apr. 19, 2015].

Qualcomm Incorporated: "UE-to-Network Relay Conclusions", 3GPP Draft, S2-150925-Eprose-UE-to-Network Relay, 3rd Generation Partnership Project (3GPP), Mobile Competence Centre, 650, Route Des Lucioles, F-06921 Sophia-Antipolis Cedex, France, vol. SA WG2, no. San Jose Del Cabo, Mexico, Apr. 13, 2015-Apr. 17, 2015, Apr. 13, 2015 (Apr. 13, 2015), pp. 1-4, XP050942806, Retrieved from the Internet: URL: http://www.3gpp.org/ftp/Meetings_3GPP SYNC/SA2/Docs/, [retrieved on Apr. 13, 2015].

Ericsson: "Measurements, Signaling, and Selection Rules for Relay Discovery", 3GPP Draft, R1-151767 Relay Selection Rules, 3rd Generation Partnership Project (3GPP), Mobile Competence Centre, 650, Route Des Lucioles, F-06921 Sophia-Antipolis Cedex, France, vol. RAN WG1, no. Belgrade, Serbia, Apr. 20, 2015-Apr. 24, 2015, Apr. 19, 2015 (Apr. 19, 2015), 7 Pages, XP050934628, Retrieved from the Internet: URL:http://www.3gpp.org/ftp/Meetings_3GPPSYNC/RAN1/Docs/ [retrieved on Apr. 19, 2015].

* cited by examiner

SYSTEMS, METHODS, AND DEVICES FOR LINK QUALITY BASED RELAY SELECTION

CROSS-REFERENCE TO RELATED APPLICATION(S)

This application claims the benefit of U.S. Provisional Application Ser. No. 62/161,874, entitled "SYSTEMS, METHODS, AND DEVICES FOR LINK QUALITY BASED RELAY SELECTION" and filed on May 14, 2015, which is expressly incorporated by reference herein in its entirety.

BACKGROUND

Field

The present disclosure relates generally to communication systems, and more particularly, to relay selection in communication systems.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

LTE has been applied to develop a device-to-device technology that enables mobile devices and applications to passively discover and interact with the world around them. In some examples, this device-to-device technology may be referred to as LTE Direct (LTE-D). In LTE-D operations, a user equipment (UE) may move out of coverage. When the UE moves out of coverage, in order to continue the communication with the network, the UE may need to make use of a Proximity-Based Service (ProSe) UE-to-Network Relay node.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

As discussed above, in LTE-D operations, the UE may move out of coverage. When the UE, e.g., the remote UE, moves out of coverage, in order to continue the communication with the network, the UE may need to make use of a ProSe UE-to-Network Relay node. The remote UE may select the best relay UE among many candidate relay UEs that may or may not be connected to the same base station. The remote UE may choose between a first potential relay UE, relay UE 1 and a second potential relay UE, relay UE 2. The quality of the link may be a function of both a link between the relay UE and the remote UE and a link between the relay link and the relay link's serving base station (e.g., eNB). Accordingly, the one-hop link quality between the remote UE and the base station may be limited by the minimum of the link quality of the relay link and the link quality of the link between the relay UE and the base station. The overall link quality may need to take into account both the spectral efficiency (e.g., bps/Hz) of the link and the loading of the base station/relay UE.

The remote UE may choose the relay UE that offers the maximum one-hop link quality. Alternatively, the remote UE may also choose the relay UE that minimizes the total resource usage on the link between the remote UE and the relay UE (PC5) and the link between the relay UE and the base station (Uu). Accordingly, in general, the relay selection may be based on the combination of the PC5 and Uu link quality, and additionally, each of the links may be weighted to achieve different tradeoffs in the network performance.

The spectral efficient of the PC5 link to the relay may be measured at the remote UE using a PC5 transmission (e.g., a discovery message broadcasting the relay availability) from the relay UEs. The spectral efficiency of the Uu link between the relay UE and eNodeB may be broadcasted by the relay UE in the PC5 messages (e.g., the same discovery message that may be used to broadcast the relay availability). The loading may be modeled as a weighing factor on the spectral efficiency to represent the link quality. Assuming the weights are known at the Remote UE, the Remote UE may then choose a relay UE as described herein.

In an aspect of the disclosure, a method, a computer program product, and an apparatus are provided. The apparatus determines a first link quality. The first link quality indicates a link quality of a first link between a first potential relay UE and the remote UE. The apparatus determines a second link quality. The second link quality indicates a link quality of a second link between the first potential relay UE and a first base station. The apparatus ranks the first potential relay UE relative to a second potential relay UE. The ranking of the first potential relay UE is based on a combination of the first link quality and the second link quality. The apparatus selects one of the first potential relay UE and the second potential relay UE for a relay connection based on the ranking of the first potential relay UE relative to the second potential relay UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
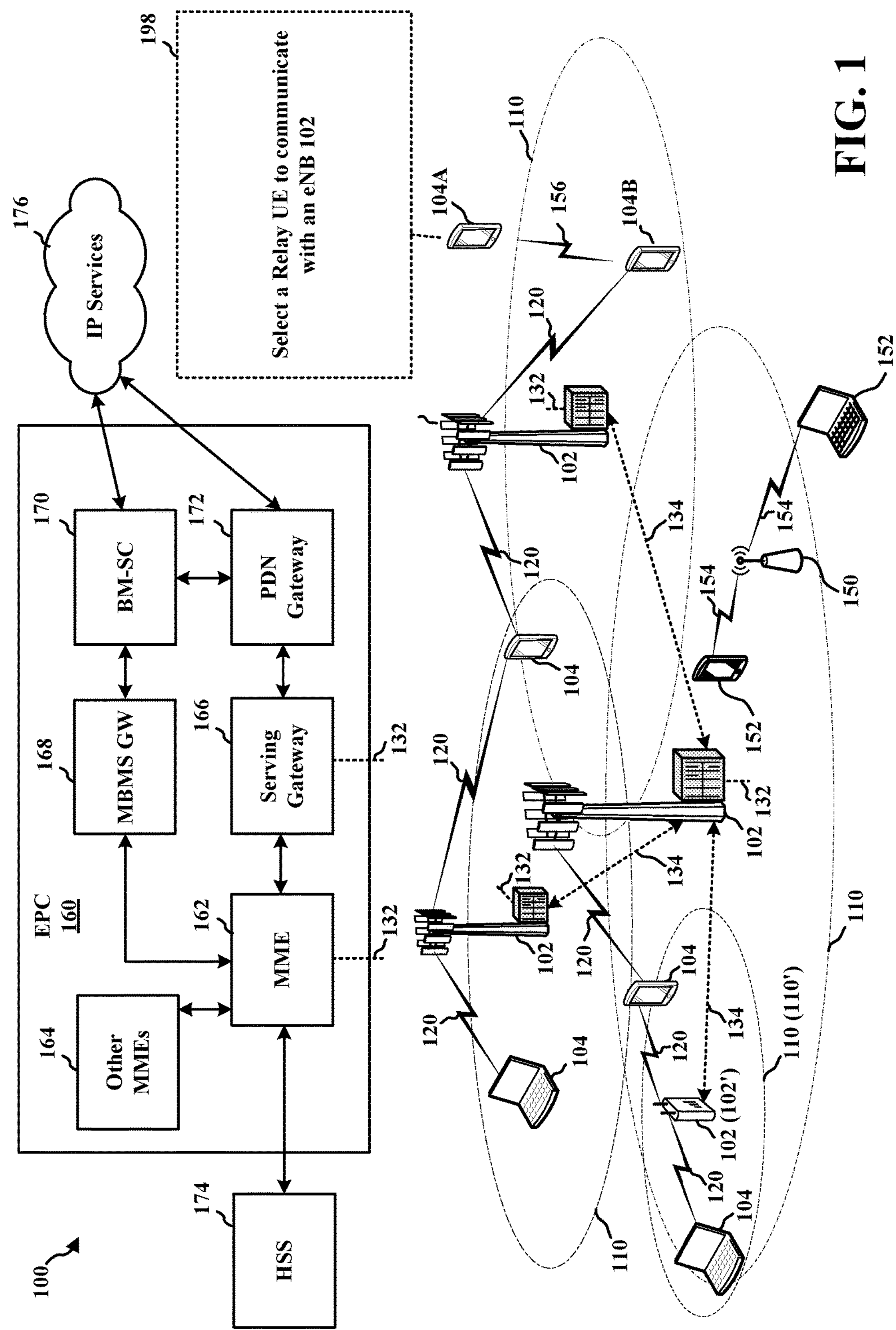
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as UMTS Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the geographic coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point 150 in communication with Wi-Fi stations (STAs) 152 via communication links 154 in a 5 GHz unlicensed frequency spectrum. When communicating in an unlicensed frequency spectrum, the STAs 152/Wi-Fi access point 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi access point 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104A may be configured to select a relay UE 104B to communicate with a base station 102, e.g., eNB (198). The UE 104A may have a communications link 156. The communications link 156 may be between the UE 104A and the UE 104B. The communications link 156 may include UL (also referred to as reverse link) transmissions from a UE 104A to the UE 104B which the UE 104B may transmit to the base station 102. The communications link 156 may include downlink (DL) (also referred to as forward link) transmissions from the UE 104B to a UE 104A.

Figures 2A, 2B, 2C, 2D:
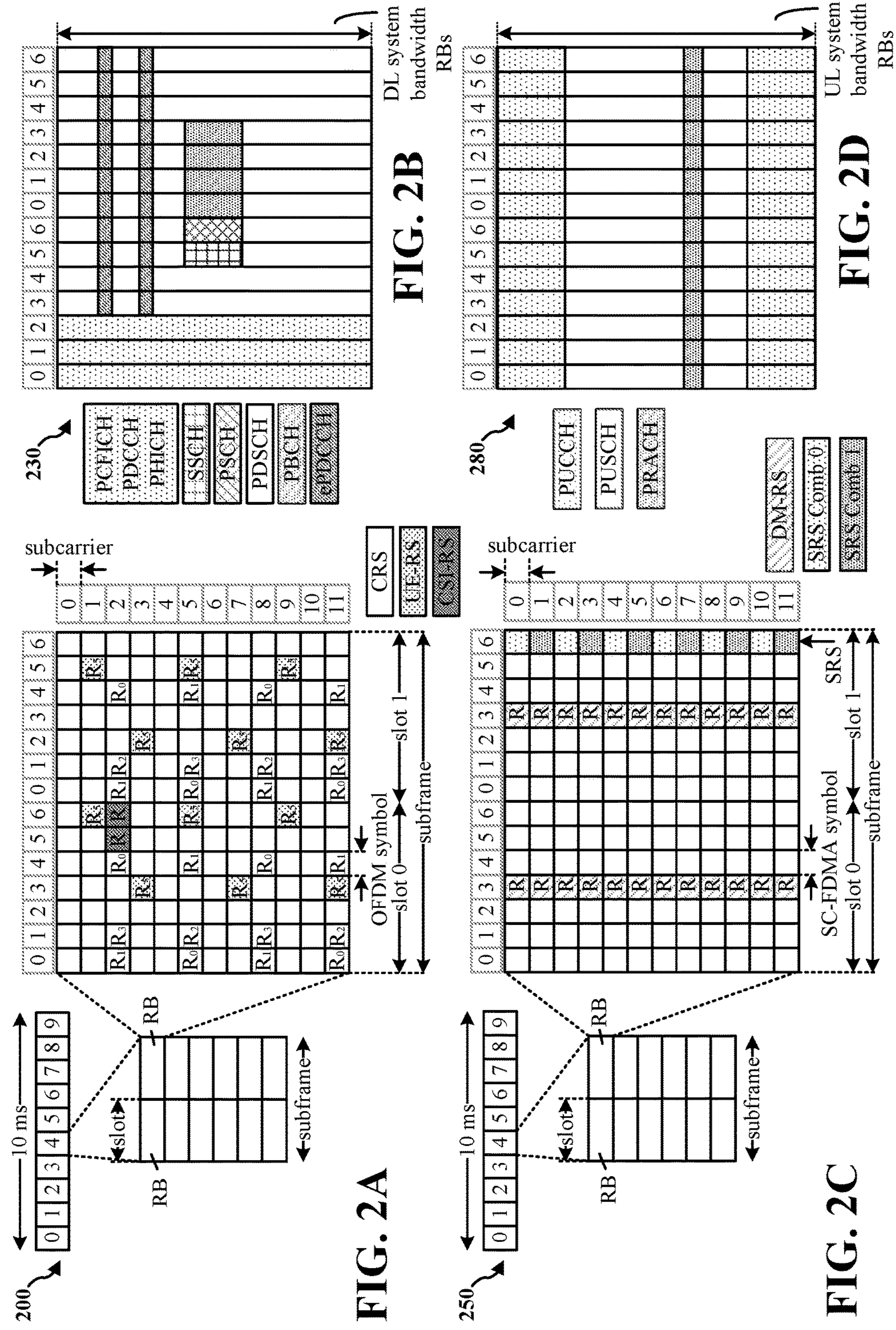
FIGS. 2A, 2B, 2C, and 2D are diagrams illustrating LTE examples of a DL frame structure, DL channels within the DL frame structure, a UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as R5), and CSI-RS for antenna port 15 (indicated as R). FIG.

2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
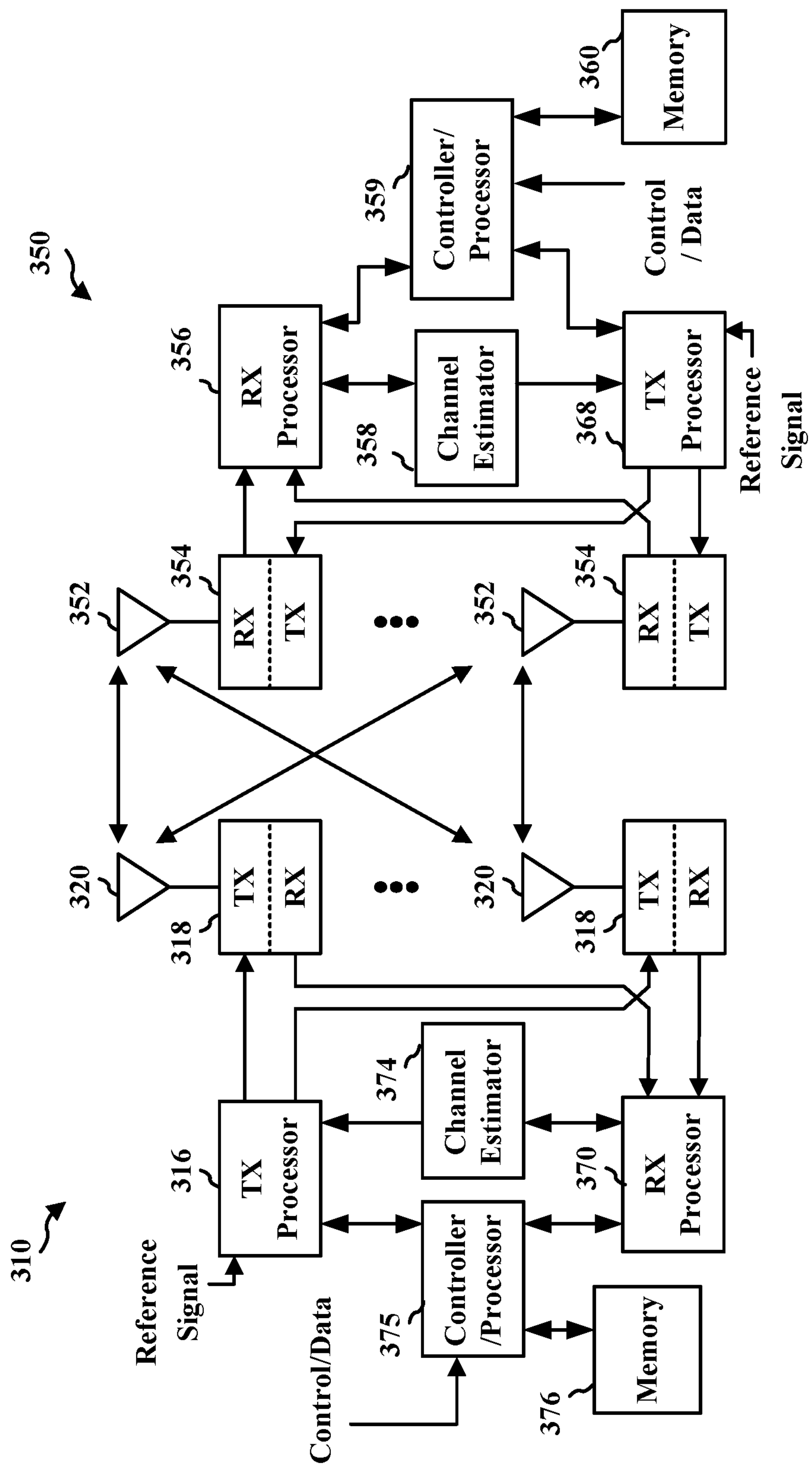
FIG. 3 is a diagram illustrating an example of an eNB and UE in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer. Layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter-radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers the information modulated onto an RF carrier and provides the information to an RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
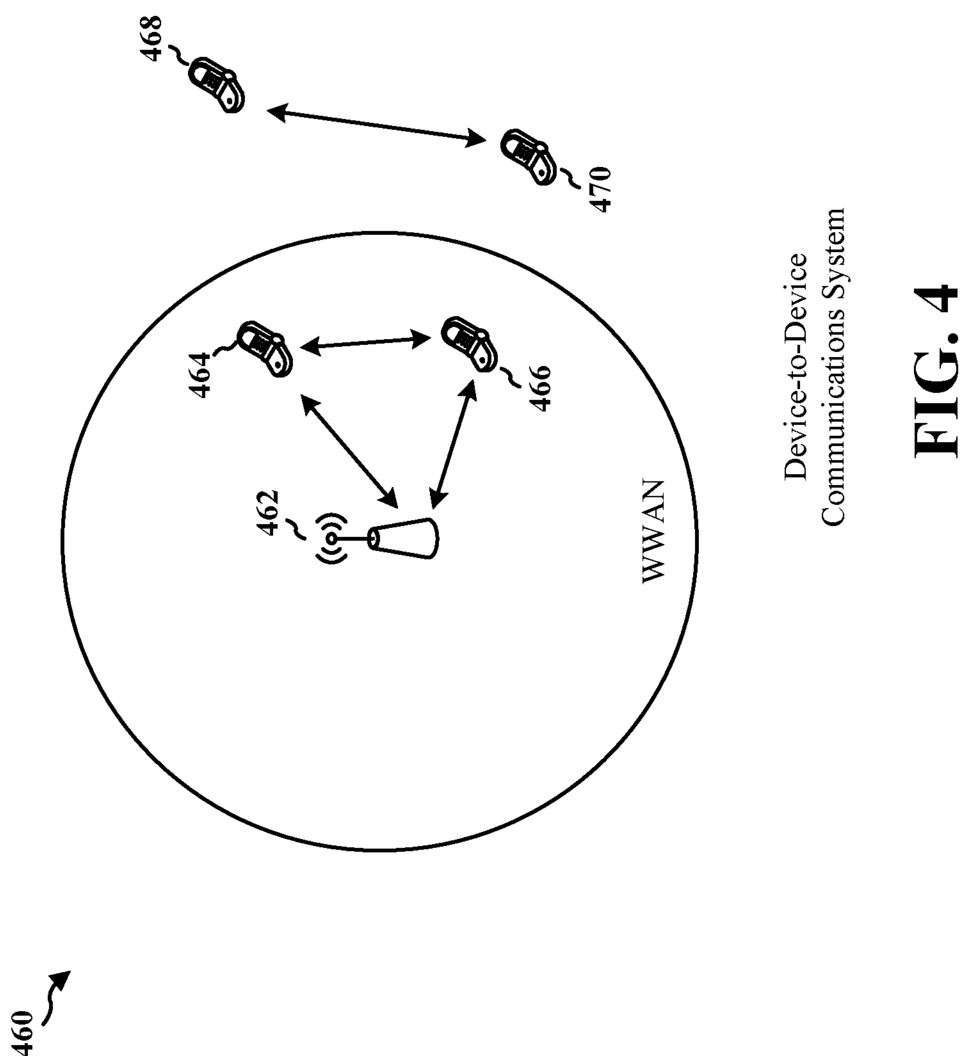
FIG. 4 is a diagram of a device-to-device communications system.

FIG. 4 is a diagram of a device-to-device (D2D) communications system 460. The D2D communications system 460 includes a plurality of UEs 464, 466, 468, 470. The D2D communications system 460 may overlap with a cellular communications system, such as for example, a WWAN. Some of the UEs 464, 466, 468, 470 may communicate together in D2D communication using the DL/UL WWAN spectrum, some may communicate with the base station 462, and some may do both. For example, as shown in FIG. 4, the UEs 468, 470 are in D2D communication and the UEs 464, 466 are in D2D communication. The UEs 464, 466 are also communicating with the base station 462. The D2D communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

The exemplary methods and apparatuses discussed infra are applicable to any of a variety of wireless D2D communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

Figure 5:
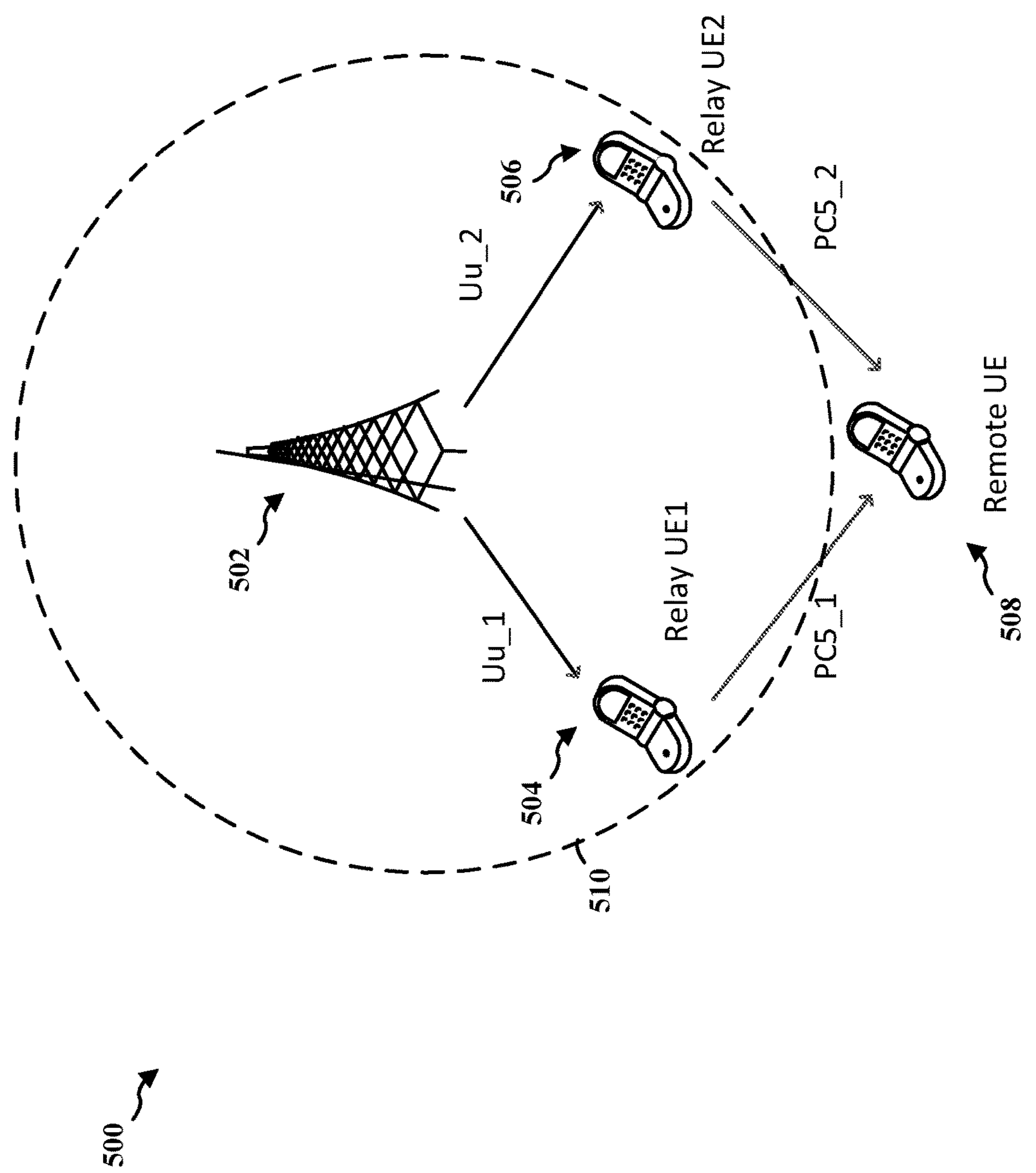
FIG. 5 is a diagram illustrating an example system, including a base station relay, and a remote UE in accordance with some aspects of the present disclosure.

FIG. 5 is a diagram illustrating an example system, 500 including a base station 502 (e.g., eNB), potential relay UEs 504, 506, a remote UE 508, and a coverage area 510 in accordance with some aspects of the present disclosure. In LTE-D operations, a UE may move out of the coverage area 510. The coverage area 510 may be an area within communications range of the base station 502. A UE that moves out of the coverage area 510 may be referred to as a remote UE 508 because the remote UE 508 is not in the coverage area 510, i.e., the remote UE 508 is "remote" from the coverage area 510.

The systems and methods described herein generally relate to selecting a relay node between the first potential relay UE 504, the second potential relay UE 506, or other available relay nodes. Two potential relay UE, e.g., the potential relay UEs 504, 506 are illustrated in FIG. 5, however, it will be understood that the systems and methods described herein may be applied to any number of potential relay UEs 504, 506.

Figure 6:
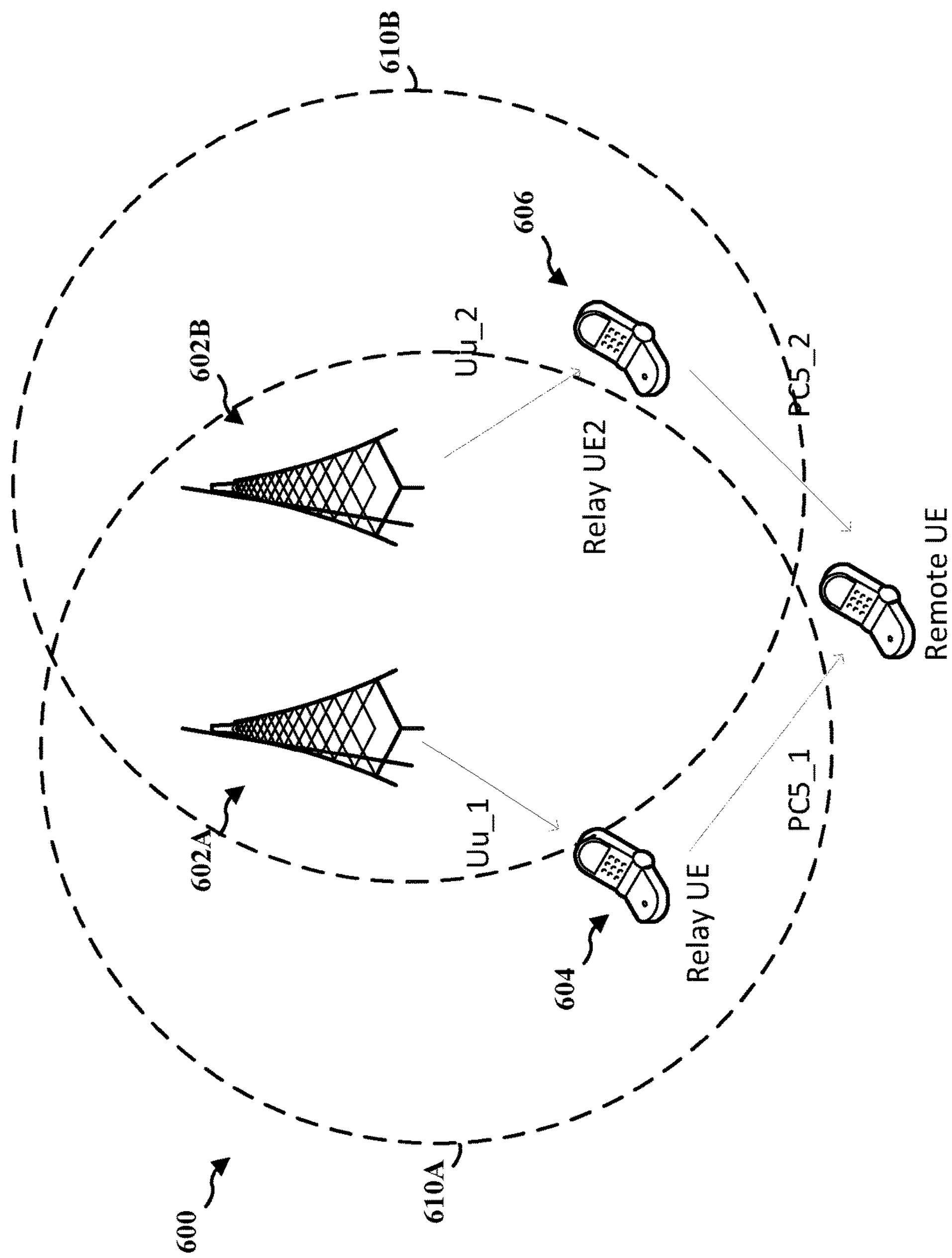
FIG. 6 is a diagram illustrating an example system, including a pair of base station relays, and a remote UE in accordance with some aspects of the present disclosure.

In the example of FIG. 5, the remote UE 508 may have to select the best relay UE among many candidate relay UEs (potential relay UEs 504, 506 are illustrated in FIG. 5). As illustrated in FIG. 5, the potential relay UEs 504, 506 may be connected to the same base station 502. In other examples, however, candidate relay UEs are not connected to the same base station, as illustrated in FIG. 6 discussed below.

The remote UE 508 may be considered to be outside of the coverage area 510 because signals to the base station are not detectable by the base station, signals from the base station are not detectable by the remote UE, or both. In some examples, the remote UE 508 may also be considered to be outside of the coverage area 510 because the signal quality of signals to the base station, the signal quality of signals from the base station, or both are of poor quality, e.g., difficult to decode. Alternatively, when the signal quality of signals to the base station, from the base station, or both are of poor quality, the UE may be considered to be on the edge of coverage. The determination that a UE is at an edge of coverage or that a UE that is in an area outside of coverage may vary from implementation to implementation.

When the remote UE 508 is at an edge of the coverage area 510 or outside of the coverage area 510, in order to continue a communication with a network, the remote UE 508 may need to make use of a ProSe UE-to-Network Relay node, e.g., a potential relay UE 504, 506. The determination of when the remote UE 508 should communicate with the base station through one of the potential relay UEs 504, 506, and when the remote UE 508 should continue to communicate directly with the base station 502 may vary from implementation to implementation. In some example implementations, the remote UE 508 may communicate through one of the potential relay UEs 504, 506 even when the remote UE 508 can communicate directly with the base station 502. For example, the remote UE 508 may communicate through one of the potential relay UEs 504, 506 even when the remote UE 508 can communicate directly with base station 502 when the signal quality between the remote UE 508 and the base station 502 (directly) is poor. A determination that the signal quality is poor may be made based on any of the various known signal quality determinations, including, for example, reference signal received power (RSRP), reference signal received quality (RSRQ), signal-to-noise ratio (SNR), or signal-to-interference-plus noise ratio (SINR) to name only four examples.

When a signal between the base station 502 and the remote UE 508 is not receivable, e.g., the base station 502 and the remote UE 508 are too far apart, something is obstructing the signal path between the base station 502 and the remote UE 508, or for some other reason, the remote UE 508 may need to use a potential relay UE 504, 506 (if one is available) to continue communicating with the base station 502. As described herein, the remote UE 508 and one of the potential relay UE 504 and the potential relay UE 506, may be used to allow the remote UE 508 and the base station 502 to continue to communicate.

As illustrated in FIG. 5, for ease of example, two possible candidate relay UEs, i.e., potential relay UEs 504, 506 are illustrated. The remote UE 508 may have to choose between the potential relay UE 504 and the potential relay UE 506. The selection of the candidates, e.g., potential relay UEs 504, 506 may be based on signal quality, among other things. In some examples weighting factors may be used to take into consideration some combination of signal quality, base station loading, spectral efficiency, and other factors when determining the potential relay UE 504, 506 to select.

The quality of the link may be a function of both a first link quality and a second link quality, i.e., the link quality over each of two links. For example, the first link quality may indicate the link quality of a link between the potential relay UE 504 and the remote UE 508. The second link quality may be a link quality of a link between the potential relay UE 504 and the base station 502. In some examples, the first link may be an interface PC5 link for one of the potential relay UEs 504, 506 and the remote UE 508. The second link may be an interface Uu link (e.g., backhaul link) between one of the potential relay UEs 504, 506 and the base station 502, e.g., a serving eNodeB (also referred to as an eNB).

The one-hop link quality between the remote UE 508 and the base station 502, e.g., eNB, may be limited by the minimum of the first link quality and the second link quality, e.g., the PC5_link_quality and the Uu_link_quality. In some examples, the link quality may take into account both the spectral efficiency (e.g., bps/Hz) of the link and the loading of the base station/relay UE. For example, in some examples, the remote UE 508 may select or choose the potential relay UE 504, 506 that offers the maximum one-hop link quality. Alternatively, in another example, the remote UE 508 may also choose or select the potential relay UE 504, 506 that minimizes the total resource usage, e.g., on the PC5 link and the Uu link. Accordingly, in general, the relay selection may be based on the combination of the PC5 link quality, the Uu link quality, the PC5 link loading, and the Uu link loading. In order to take the PC5 link loading, the Uu link loading, or both into account, one or more of the links may be weighted to achieve different tradeoffs in the network performance, as described herein.

In the example of FIG. 5, the remote UE 508 may have to select the best relay UE among many candidate relay UEs (with two candidate relay UE's, i.e., potential relay UEs 504, 506 illustrated in FIG. 5). Potential relay UEs 504, 506 may or may not be connected to the same base station 502. For ease of exemplification, two candidate relay UEs, i.e., potential relay UEs 504, 506 connected to the same base station 502, are considered in the example of FIG. 5. It will be understood that the systems and methods described herein may be applied to the selection of a relay UE from much more than two candidates.

In some examples, the spectral efficiency of the PC5 link to the relay can be measured at the remote UE using a PC5 signal, PC5 message, or PC5 transmission (e.g., a discovery message broadcasting the relay availability) from the relay UEs. The spectral efficiency of the Uu link between the potential relay UE 504, 506 and the base station 502, e.g., eNB, may be broadcasted by the potential relay UE 504, 506 in the PC5 messages (e.g., the same discovery message above that is being used to broadcast the relay availability). Loading of the Uu link may be modeled as a weighing factor on the spectral efficiency to represent the link quality. Assuming the weights are known at the remote UE 508, the remote UE 508 may then choose or select one of the potential relay UEs 504, 506. Accordingly, some examples may combine PC5 link quality and Uu link quality for relay selection.

Some examples may select a potential relay UE 504, 506 to maximize one-hop rate, e.g., minimizes the time for one hop (e.g., a transmission from a source to a receiver). In an example that maximizes the one hope rate, the relay UE may be selected based on the following equation:

$$\begin{aligned}&\text{Relay UE selected}=\arg\max_i\{\min\{(1-w1)*SE\_PC5_{Remote\text{-}Relay\ i},(1-w2)*SE\_Uu_{Relay\ i\text{-}eNB}\}\}\ \text{if}\ w1!=0,w2!=0,\ \text{(where != is not equal)}\\&\arg\max_i\{SE\_PC5_{Remote\text{-}Relay\ i}\}\ \text{if}\ w1=1,w2=0\\&\arg\max_i\{SE\_Uu_{Relay\ i\text{-}eNB}\}\ \text{if}\ w1=0,w2=1\end{aligned}\qquad\text{(EQ 1).}$$

Some examples may select a potential relay UE 504, 506 based on minimizing the use of radio resources. In an example that minimizes the use of radio resources, the relay UE may be selected base on the following equation:

$$\text{Relay UE selected}=\arg\min i\{w1*(1/SE\_PC5_{Remote\text{-}Relay\ i})+w2*(1/SE\_Uu_{Relay\ i\text{-}eNB})\}\qquad\text{(EQ 2).}$$

The weights w1 and w2 may be preconfigured in the remote UE, broadcasted by the base station, e.g., eNB, (SIBS or dedicated RRC), broadcast by the relay UE (e.g., in discovery message or in PSBCH), or fixed in specification.

Selecting the potential relay UEs 504, 506, using the above formula may also allow for optimization of the performance of the UE-NW relay selection depending on the operating scenarios. For example, in some operating scenarios choosing the best PC5 link (w2=1, w2=0) may be close to an optimal solution, while in others a more balanced approach of also accounting for Uu link (w2 !=0) may lead to better network performance (with regards to additional load on the network).

FIG. 6 is a diagram 600 illustrating an example system, including a first base station 602A and a second base station 602B, a remote UE 608, potential relay UEs 604, 606, and a pair of coverage areas 610A, 610B in accordance with some aspects of the present disclosure. As discussed above, in LTE-D operations, a UE may move out of one of the coverage areas 610A, 610B. The coverage areas 610A, 610B may be areas within communications range of one or more of the first base station 602A and/or the second base station 602B, respectively. Selecting a relay node between the potential relay UE 604, the potential relay UE 606, or other available relay UEs may be based on the various systems and methods described herein. Two potential relay UEs 604, 606 are illustrated in FIG. 6, however, it will be understood that the systems and methods described herein may be applied to any number of potential relay UEs 604, 606.

In the example of FIG. 6, the remote UE 608 may have to select the best relay UE among many candidate relay UEs (two candidate relay UEs, i.e., potential relay UEs 604, 606 are illustrated in FIG. 6). As illustrated in FIG. 6, the potential relay UEs 604, 606 may be connected to different base stations 602A, 602B.

When remote UE 608 is at an edge of one of the coverage areas 610A, 610B or outside of one of the coverage areas 610A, 610B, in order to continue a communication with a network, the remote UE 608 may need to make use of a ProSe UE-to-Network Relay node, e.g., a potential relay UE 604, 606. The determination of when the remote UE 608 should communicate with one of the base stations 602A, 602B through one of the potential relay UEs 604, 606, and when the remote UE 608 should continue to communicate directly with one of the base stations 602A, 602B may vary from implementation to implementation. In some example implementations, the remote UE 608 may communicate through one of the potential relay UEs 604, 606 even when the remote UE 608 can communicate directly with the base stations 602A, 602B. For example, the remote UE 608 may communicate through one of the potential relay UEs 604, 606 even when the remote UE 608 can communicate directly with the first base station 602A or base station 602B, e.g., when the signal quality is poor. A determination that the signal quality is poor may be made based on any of the various known signal quality determinations, including, for example, RSRP or RSRQ, to name only two examples.

When a signal between one or more of the base stations 602A, 602B and the remote UE 608 is not receivable, e.g., one of the base stations 602A, 602B and the remote UE 608 are too far apart, the remote UE 608 will have to use a potential relay UE 604, 606 (if one is available) to continue communicating with that base station 602A, 602B. As described herein, the Remote UE 608 and a ProSe UE-to-Network Relay node, such as one of the potential relay UE 604 and the potential relay UE 606, may allow the remote UE 608 and the base station 602A, 602B to continue to communicate. Generally, the selection process of the potential relay UE 604, 606 may be the same or similar to situations where the potential relay UEs 504, 506 are connected to the same base station 502 (FIG. 5) as for situations where the potential relay UEs 604, 606 are connected to different base stations 602A, 602B (FIG. 6). In some instances the base station 602A, 602B that the remote UE 608 is communicating with or has most recently communicated with may be given priority.

Figure 7:
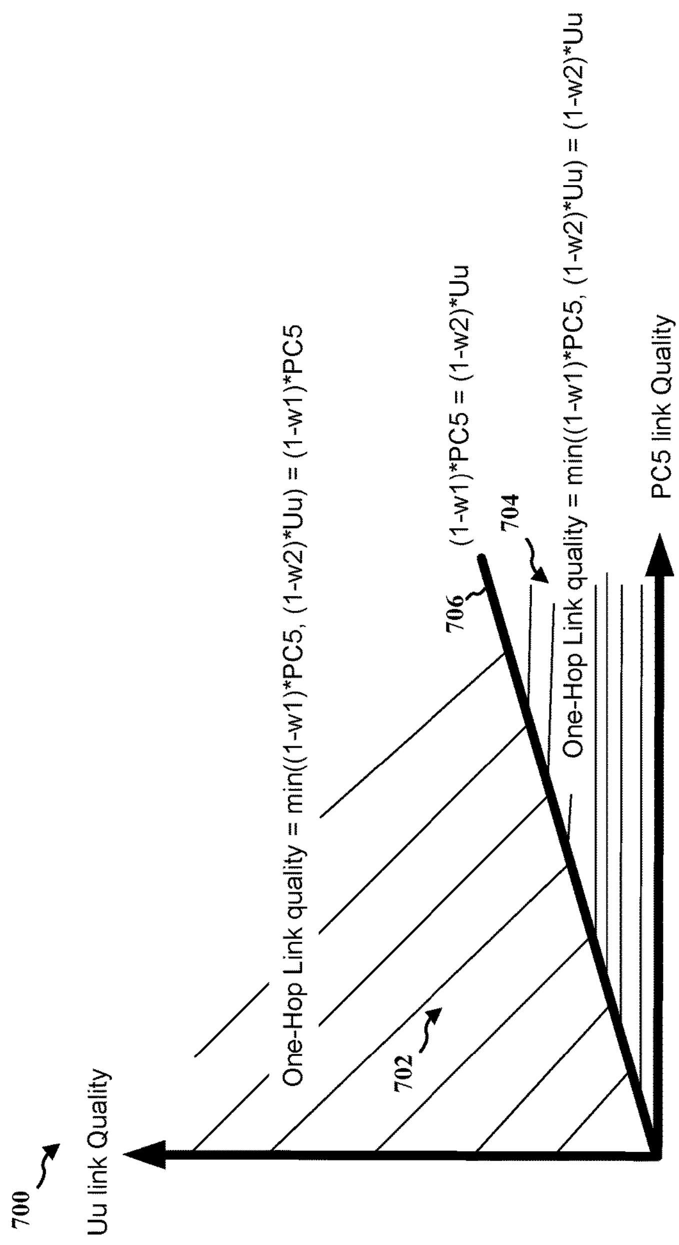
FIG. 7 is a graph illustrating selection areas for Uu link quality versus PC5 link quality for a first weight, w1 and a second weight, w2.

FIG. 7 is a graph 700 illustrating selection areas 702, 704 for Uu link quality versus PC5 link quality for a first weight, w1 and a second weight, w2. FIG. 7 illustrates an example case when w1 is larger than w2. More specifically, FIG. 7 illustrates the case when $w1=3/4$ and $w2=1/4$. The line 706 on the graph 700 is: $y=x/3$. The case illustrated in FIG. 6 is an example with more weight given to the PC5 link quality. Accordingly, even though in some cases the Uu link quality of one link may be worse than the Uu link quality of another link, the link with the lower Uu link quality may be selected, i.e., when the PC5 link quality for a particular path is high enough to overcome the poor quality on the particular Uu link. (Overcoming poor link quality on a Uu link may not require a very high link quality on a PC5 link, depending on the weights, e.g., w1, w2, used.) The link with the worst Uu link quality may be selected when the loading of the base station, e.g., eNB, is not a large constraint, e.g., more weight may be given for loading on devices other than the base station, e.g., the loading on the relay UEs. The lower region (below line 706) indicates the region where a particular Uu link quality is extremely poor, such that the particular Uu link may cause too much load on the base station, e.g., eNB. Accordingly, in the example in the lower region of FIG. 7 (below line 706) the Uu link quality for the particular Uu link may become the bottleneck. The weights, e.g., w1 and w2, may be used to come up with a score for a particular signal path through a relay, e.g., the potential relay UEs 504, 506 of FIG. 5 or the potential relay UEs 604, 606 of FIG. 6. Different relay paths may be selected based on the score.

FIG. 7 illustrates example boundary conditions for selection between a Uu link and a PC5 link as indicated by the equation below:

$$\min((1-w1)*PC5,(1-w2)*Uu)=0 \text{ if } w1=1, \text{ or } w2=1 \qquad \text{(EQ 3)}$$

In some examples, the link quality can be any function, and a weighted combination of PC5 and Uu link quality is taken. The first weighting factor and the second weighting factor may be fixed values. In another example, the first weighting factor and the second weighting factor may be preconfigured in the remote UE. At least one of the first weighting factor or the second weighting factor may be set by a serving cell. In some examples, the first weighting factor or the second weighting factor may be transmitted directly to the remote UE in a SIB. In some examples, the at least one of the first weighting factor or the second weighting factor may be transmitted as a dedicated RRC signaling (unicast). The at least one of the first weighting factor or the second weighting factor may be transmitted as a part of a PC5 message.

In some embodiments, when a remote UE is in coverage, the remote UE can send measurement report to a base station, e.g., eNB containing PC5 and Uu link quality. The base station may instruct the UE to connect to a particular relay based on the above criterion. The remote UE may then try to connect to the indicated relay UE and inform the base station that the remote UE was either successful or failed to connect to the indicated relay. If the UE was successful, then the eNB may optionally disconnect the UE.

Figure 8:
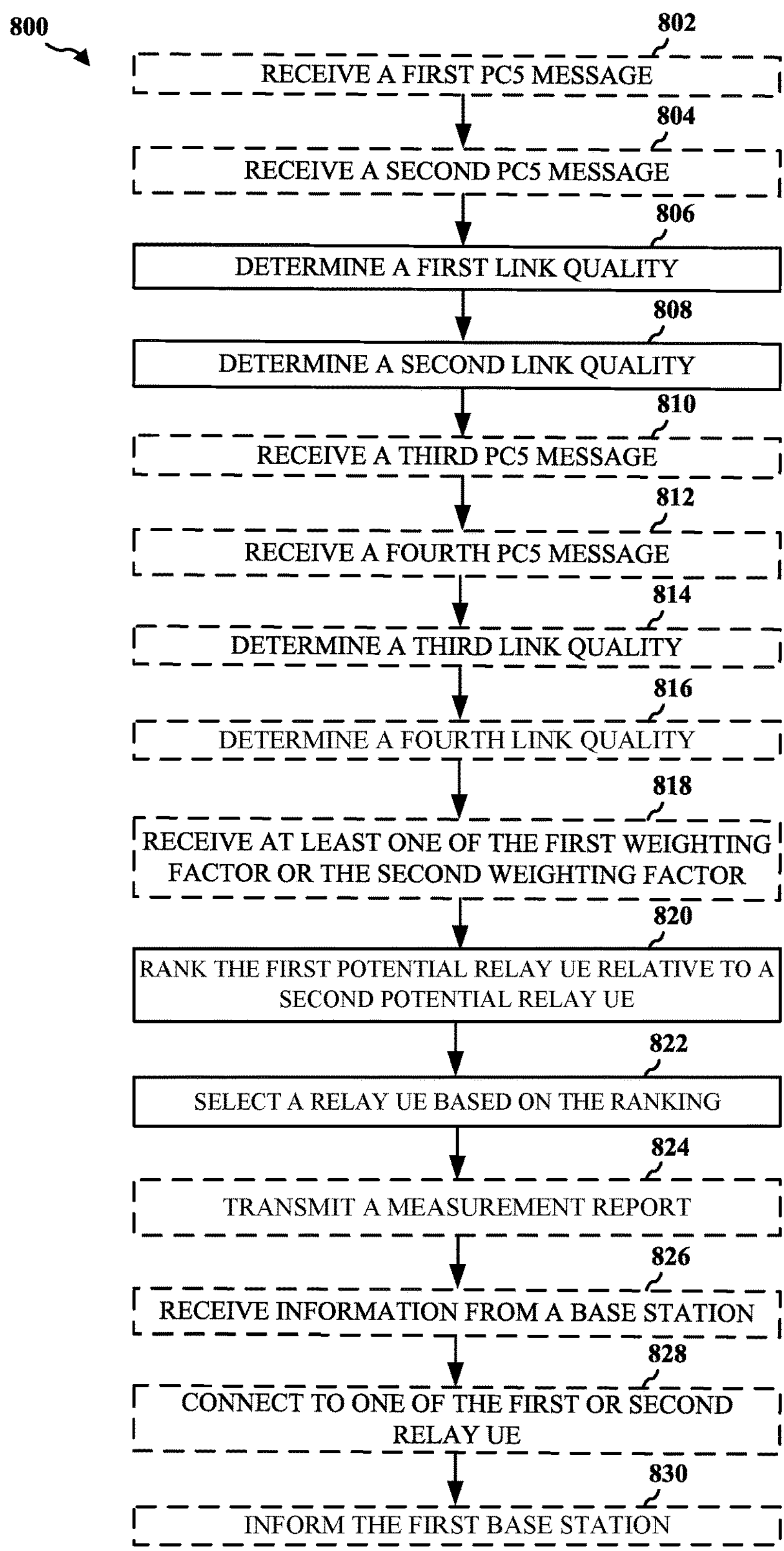
FIG. 8 is a flowchart of a method of wireless communication in accordance with some aspects of the present disclosure.

FIG. 8 is a flowchart of a method of wireless communication 800 in accordance with some aspects of the present disclosure. At 802, a remote UE may receive a first PC5 message from a first potential relay UE. For example, referring to FIGS. 5, 6, the remote UE 508, 608 may receive a first PC5 message from the first potential relay UE 504, 604. As discussed below with respect to 806, the remote UE may determine a first link quality based on the received first PC5 message.

At 804, the remote UE may receive a second PC5 message from the first potential relay UE. For example, referring to FIGS. 5, 6, the remote UE 508, 608 may receive a second PC5 message from the first potential relay UE 504, 604. The second PC5 message may include information indicating a second link quality. As discussed below with respect to 808, the remote UE may determine the second link quality based on the received second PC5 message.

At 806, the remote UE may determine a first link quality. The first link quality may indicate a link quality of a first link between a first potential relay UE and the remote UE. The first link quality may be determined based on the received first PC5 message. For example, referring to FIGS. 5, 6, the remote UE 508, 608 may determine the first link quality. The first link quality may indicate the link quality of the first link between the first potential relay UE 504, 604 and the remote UE 508, 608. The remote UE 508, 608 may determine the first link quality based on the received first PC5 message. Specifically, the remote UE 508, 608 may determine the first link quality by determining at least one of RSRP, RSRQ, SNR, SINR or some other calculable value of the received first PC5 message indicative of link quality of the first link.

At 808, the remote UE may determine a second link quality. The second link quality may indicate a link quality of a second link between the first potential relay UE and a first base station. The second PC5 message may include information indicating the second link quality. For example, referring to FIGS. 5-6, the remote UE 508, 608 may determine a second link quality. The second link quality may indicate a link quality of a second link between the first potential relay UE 504, 604 and a first base station 502, 602A. The second PC5 message may include information indicating the second link quality. Specifically, the information may be at least one of an RSRP, an RSRQ, an SNR, or an SINR of the second link.

At 810, the remote UE may receive a third PC5 message from the second potential relay UE. For example, referring to FIGS. 5, 6, the remote UE 508, 608 may receive a third PC5 message from the second potential relay UE 506, 606. As discussed below with respect to 814, the remote UE may determine a third link quality based on the received third PC5 message.

At 812, the remote UE may receive a fourth PC5 message from the second potential relay UE. For example, referring to FIGS. 5-6, the remote UE 508, 608 may receive a fourth PC5 message from the second potential relay UE 506, 606. The fourth PC5 message may include information indicating a fourth link quality. As discussed below with respect to 816, the remote UE may determine the fourth link quality based on the received fourth PC5 message.

At 814, the remote UE may determine a third link quality. The third link quality may indicate a link quality of a third link between the second potential relay UE and the remote UE. The third link quality may be determined based on the received third PC5 message. For example, referring to FIGS. 5, 6, the remote UE 508, 608 may determine a third link quality. The third link quality may indicate a link quality of a third link between the second potential relay UE 506, 606 and the remote UE 508, 608. The third link quality may be determined based on the received third PC5 message. Specifically, the remote UE 508, 608 may determine the third link quality by determining at least one of RSRP, RSRQ, SNR, SINR or some other calculable value of the received third PC5 message indicative of link quality of the third link.

At 816, the remote UE may determine a fourth link quality. The fourth link quality may indicate a link quality of a fourth link between the second potential relay UE and a second base station. The fourth PC5 message may include information indicating the fourth link quality. For example, referring to FIG. 6, the remote UE 608 may determine a fourth link quality. The fourth link quality may indicate a link quality of a fourth link between the second potential relay UE 606 and a second base station 602B. The fourth PC5 message may include information indicating the fourth link quality. Specifically, the information may be at least one of an RSRP, an RSRQ, an SNR, or an SINR of the fourth link.

At 818, the remote UE may receive information indicating at least one of the first weighting factor or the second weighting factor from a serving base station. For example, referring to FIGS. 5, 6, the remote UE 508, 608 may receive information indicating at least one of the first weighting factor w1 or the second weighting factor w2 from a base station 502, 602A, 602B.

In some examples, the remote UE 508, 608 may receive information indicating at least one of the first weighting factor w1 or the second weighting factor w2 from one of the first potential relay UE 504, 604 or the second potential relay UE 506, 606 as a part of a PC5 message. In some examples, the remote UE 508, 608 may receive information indicating at least one of the first weighting factor w1 or the second weighting factor w2 from a first base station 502 (which may be a serving base station) over Uu_1, through the first potential relay UE 504, 604, and over a PC5 link, PC5_1, as illustrated in FIGS. 5, 6. Alternatively, the remote UE 508, 608 may receive information indicating at least one of the first weighting factor w1 or the second weighting factor w2 from a first base station 502, 602A over Uu_1, when the remote UE 508, 608 is in coverage of the first base station 502, 602A.

At 820, the remote UE may rank the first potential relay UE relative to a second potential relay UE. The ranking of the first potential relay UE may be based on a combination of the first link quality and the second link quality. For example, referring to FIGS. 5, 6, the remote UE 508, 608 may rank the first potential relay UE 504, 604 relative to a second potential relay UE 506, 606. The ranking of the first potential relay UE 504, 604 may be based on a combination of the first link quality and the second link quality.

Accordingly, ranking of the first potential relay UE 504, 604 may include combining the first link quality and the second link quality and using the combined first link quality and second link quality to compare the first potential relay UE 504, 604 against other UEs, e.g., the second potential relay UEs 506, 606. The remote UE 508 may combine the first link quality and the second link quality. The remote UE 508, 608 may use the combined first link quality and second link quality to compare the first potential relay UE 504, 604 against other UEs, e.g., the potential relay UEs 506, 606. In some examples, ranking the first potential relay UE 504, 604 relative to a second potential relay UE 506, 606, includes comparing the combination of the first link quality and the second link quality to a combination of the third link quality and the fourth link quality. Accordingly, the remote UE 508 may compare the combination of the first link quality and the second link quality to a combination of the third link quality and the fourth link quality.

At 822, the remote UE may select one of a first potential relay UE and a second potential relay UE for a relay connection based on the ranking of the first potential relay UE relative to the second potential relay UE. For example, referring to FIGS. 5, 6, the remote UE 508, 608 may select one of the first potential relay UE 504, 604 and the second potential relay UE 506, 606 for a relay connection based on the ranking of the first potential relay UE 504, 604 relative to the second potential relay UE 506, 606.

Selecting a potential relay UE 504, 506, 604, 606 based on the ranking of the first potential relay UE 504, 604 and the second potential relay UE 506, 606 may include comparing the rankings of the first potential relay UE 504, 604 and the second potential relay UE 506, 606 and choosing the potential relay with the highest ranking. Accordingly, the remote UE 508, 608 may compare the rankings of the first potential relay UE 504, 604 and the second potential relay UE 506, 606 and choose the potential relay UE 504, 506 604, 606 with the highest ranking.

At 824, the remote UE may transmit a measurement report to the first base station. The measurement report may include at least one of the first link quality and the second link quality. For example, referring to FIGS. 5, 6, the remote UE 508, 608 may transmit a measurement report to the first base station 502, 602. The measurement report may include at least one of the first link quality and the second link quality. The measurement report may further include at least one of the third link quality and the fourth link quality.

At 826, the remote UE may receive information from the first based station indicating at least one of the first potential relay UE or the second potential relay UE. The received information may be based on the transmitted measurement report. For example, referring to FIGS. 5, 6, the remote UE 508, 608 may receive information from the first base station 502, 602A indicating at least one of the first potential relay UE 504, 604 or the second potential relay UE 506, 606. The received information may be based on the transmitted measurement report.

At 828, the remote UE may connect to one of a first potential relay UE or a second potential relay UE based on the received information. For example, referring to FIGS. 5, 6, the remote UE 508, 608 may connect to one of the first potential relay UE 504, 604 or the second potential relay UE 506, 606 based on the received information.

At 830, the remote UE may inform the first base station when at least one of the remote UE is successful at connecting to the one of a first potential relay UE or a second potential relay UE, or a remote UE has failed to connect to the relay UE. For example, referring to FIGS. 5, 6, the remote UE 508, 608 may inform the first base station 502, 602A when at least one of the remote UE 508, 608 is successful at connecting to the one of the first potential relay UE 504, 604 or the second potential relay UE 506, 606, or the remote UE 508, 608 has failed to connect to the relay UE.

In some examples, a remote UE 508 may transition from an RRC connected state to an RRC idle state with respect to a first base station 502 upon successfully connecting to one of the first potential relay UE 504 or the second potential relay UE 506. A remote UE 508 may be in an RRC connected state with the first base station 502 when in range of the first base station 502 (i.e., when remote UE 508 is not actually "remote") and may use a relay, e.g., first potential relay UE 504 when not in range of the first base station 502. The remote UE 508 may be in RRC idle state with respect to a first base station 502 upon successfully connecting to one of the first potential relay UE 504 or the second potential relay UE 506.

Figure 9:
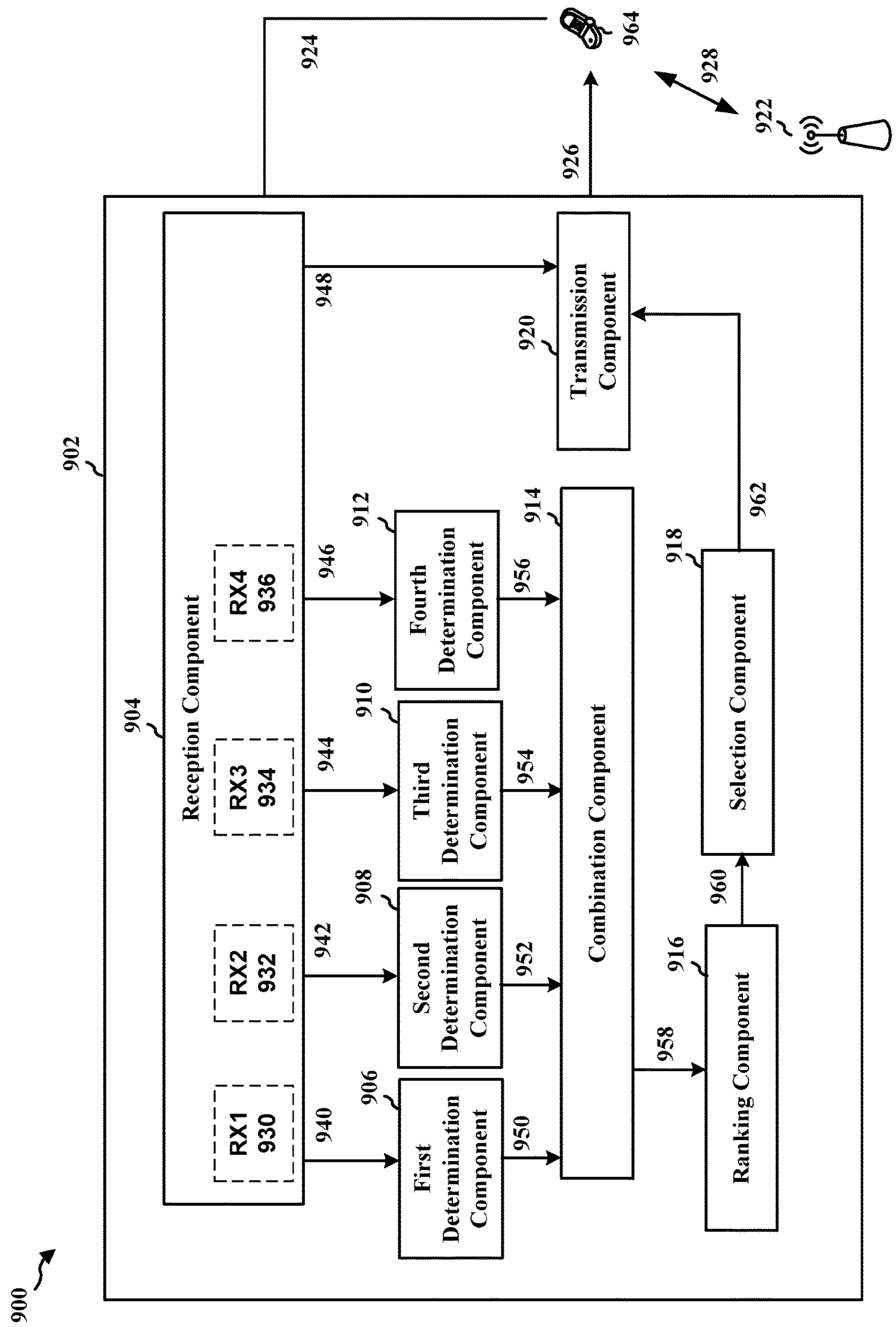
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus may be a UE. The apparatus may include a reception component 904 (e.g., RX1 930) that receives a first PC5 message from the first potential relay UE. The first link quality may be determined based on the received first PC5 message. The reception component 904 (e.g., RX2 932) may receive a second PC5 message from the first potential relay UE. The second PC5 message may include information indicating the second link quality. The reception component 904 (e.g., RX3 934) may receive a third PC5 message from the second potential relay UE. The third link quality may be determined based on the received third PC5 message. The reception component 904 (e.g., RX4 936) may receive a fourth PC5 message from the second potential relay UE. The fourth PC5 message may include information indicating the fourth link quality.

The apparatus 902 may include a first determination component 906 that determines a first link quality. The first link quality may indicate a link quality of a first link between a first potential relay UE and the remote UE. The apparatus may include a second determination component 908 that determines a second link quality. The second link quality may indicate a link quality of a second link between the first potential relay UE and a first base station. The apparatus may include a third determination component 910 that determines a third link quality. The third link quality may indicate a link quality of a third link between the second potential relay UE and the remote UE. The apparatus may include a fourth determination component 912 that determines a fourth link quality. The fourth link quality may indicate a link quality of a fourth link between the second potential relay UE and a second base station. The first link quality of the first link may be determined by determining at least one of an RSRP, an RSRQ, an SNR, or an SINR of the first PC5 message. The second link quality may also be a function of at least one of a an RSRP, an RSRQ, an SNR, or an SINR of the second link. In some examples, the first PC5 message and the second PC5 message may be the same PC5 message. In an example, the first base station and the second base station are a single base station. The first determination component 906 may receive signals 940 from the reception component 904, e.g., RX1 930. The signals may be measured to determine RSRP, RSRQ, SNR, or SINR, for example. Alternatively, the signals may include information related to the determination of the signal quality, e.g., RSRP, RSRQ, SNR, or SINR. The first-fourth determination components may measure the signals 940, 942, 944, 946 to determine RSRP, RSRQ, SNR, or SINR, for example. Similarly, the second determination component 908 may receive signals 942 from the reception component 904, e.g., RX1 932, the third determination component 910 may receive signals 944 from the reception component 904, e.g., RX1 934, and the fourth determination component 912 may receive signals 946 from the reception component 904, e.g., RX1 936. Again, the signals may be measured to determine RSRP, RSRQ, SNR, or SINR, for example. Alternatively, the signals may include information related to the determination of the signal quality, e.g., RSRP, RSRQ, SNR, or SINR. The first-fourth determination components may measure the signals 940, 942, 944, 946 to determine RSRP, RSRQ, SNR, or SINR, for example.

The apparatus 902 may include a combination component 914 that combines the first link quality and the second link quality by applying a first weighting factor to the first link quality and applying a second weighting factor to the second link quality. Multiple link quality determinations (e.g., first-fourth) may be combined. The quality determinations may be communicated to the combination component using signals 950, 952, 954, 956.

The apparatus 902 may include a ranking component 916 that ranks the first potential relay UE relative to a second potential relay UE. The ranking of the first potential relay UE may be based on a combination of the first link quality and the second link quality. In some examples, the ranking component 916 may rank the first potential relay UE may be ranked relative to the second potential relay UE further based on a combination of the third link quality and the fourth link quality. In some examples, the ranking further includes selecting a minimum of the first link quality and the second link quality. In some examples, the ranking is based on a linear average of the first link quality and the second link quality. In some examples, the ranking includes combining the first link quality and the second link quality by applying a first weighting factor to the first link quality and applying a second weighting factor to the second link quality. In some examples, the combination component 914 may be part of the ranking component 916. In some examples, the combination component may be a separate component as illustrated in FIG. 9. The combination component 914 may communicate with the ranking component using signal(s) 958.

In one example, the first weighting factor and the second weighting factor may be fixed values. In one example, the first weighting factor and the second weighting factor may be preconfigured in the remote UE. In one example, the remote UE may receive information indicating at least one of the first weighting factor or the second weighting factor from a first base station. In one example, the information indicating the at least one of the first weighting factor or the second weighting factor may be received in a SIB from the first base station 922. In another example, the information indicating the at least one of the first weighting factor or the second weighting factor is received as a dedicated RRC signaling from the first base station 922. In another example, the remote UE receives information indicating at least one of the first weighting factor or the second weighting factor from one of the first potential relay UE or the second potential relay UE as a part of a PC5 message.

The apparatus 902 may include a selection component 918 that selects one of the first potential relay UE and the second potential relay UE for a relay connection based on the ranking of the first potential relay UE relative to the second potential relay UE. The selection component may select one of the first potential relay UE and the second potential relay UE based on a highest ranking of the first potential relay UE and the second potential relay UE. Rankings may be communicated to the selection component 918 using signal(s) 960.

The apparatus 902 may include a transmission component 920 that transmits a measurement report to the first base station. The measurement report may include at least one of the first link quality and the second link quality. Referring back to the reception component 904, the reception component 904 may receive information from the first based station indicating at least one of the first potential relay UE or the second potential relay UE. The received information may be based on the transmitted measurement report. The remote UE may connect to one of the first potential relay UE or the second potential relay UE based on the received information. The transmission component may inform the first base station 922 when at least one of the remote UE is successful at connecting to the one of the first potential relay UE or the second potential relay UE, or the remote UE has failed to connect to the relay UE. The apparatus 902 may transitioning from an RRC connected state to an RRC idle state with respect to a first base station 922 upon successfully connecting to one of the first potential relay UE 964 or the second potential relay UE (not shown). The transmission component may communicate with the selection component over signal(s) 962.

As illustrated in FIG. 9, the first base station 922 may communicate with the apparatus 902 through a first potential relay UE 964. The base station may communicate with the first potential relay UE 964 over communication channel 928 and the relay UE may communicate with the apparatus 902 over transmission signal 924 and receive signal 926.

The apparatus 902 may include additional components that perform each of the blocks of the algorithm in the aforementioned flowcharts of FIG. 8. As such, each block in the aforementioned flowcharts of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
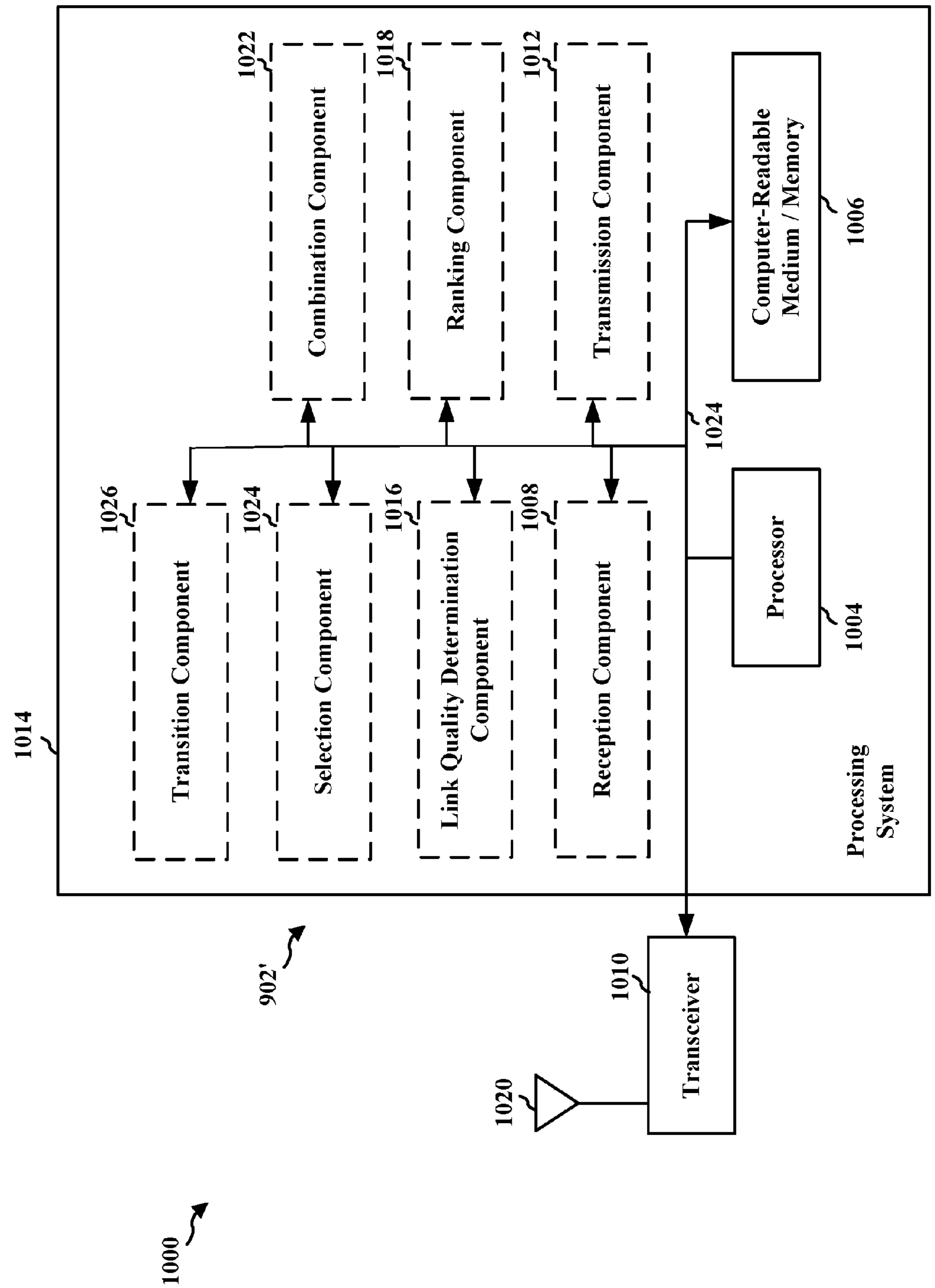
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, 914, 916, 918, 920 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 1008. In addition, the transceiver 1010 receives information from the processing system 1014, specifically the transmission component 1012, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908,910, 912, 914, 916, 918, 920. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In one configuration, a remote UE for wireless communication includes means for determining a first link quality. The first link quality indicates a link quality of a first link between a first potential relay UE and the remote UE. The remote UE further includes means for determining a second link quality. The second link quality indicates a link quality of a second link between the first potential relay UE and a first base station. The remote UE further includes means for ranking the first potential relay UE relative to a second potential relay UE. The ranking of the first potential relay UE is based on a combination of the first link quality and the second link quality. The remote UE further includes means for selecting one of the first potential relay UE and the second potential relay UE for a relay connection based on the ranking of the first potential relay UE relative to the second potential relay UE.

In one configuration, the remote UE may further include means for receiving a first PC5 message from the first potential relay UE. The first link quality is determined based on the received first PC5 message. In addition, the remote UE may further include means for receiving a second PC5 message from the first potential relay UE. The second PC5 message includes information indicating the second link quality.

In one configuration, the first PC5 message and the second PC5 message are the same PC5 message. In one configuration, the first link quality of the first link is determined by determining at least one of an RSRP, an RSRQ, an SNR, or an SINR of the first PC5 message. In one configuration, the second link quality is a function of at least one of an RSRP, an RSRQ, an SNR, or an SINR of the second link.

In one configuration, the remote UE may further include means for determining a third link quality. The third link quality may indicate a link quality of a third link between the second potential relay UE and the remote UE. In one configuration, the remote UE may further include means for determining a fourth link quality. The fourth link quality may indicate a link quality of a fourth link between the second potential relay UE and a second base station. In one configuration, the first potential relay UE may be ranked relative to the second potential relay UE further based on a combination of the third link quality and the fourth link quality.

In one configuration, the remote UE may further include means for receiving a third PC5 message from the second potential relay UE. The third link quality may be determined based on the received third PC5 message. In one configuration, the remote UE may further include means for receiving a fourth PC5 message from the second potential relay UE. The fourth PC5 message may include information indicating the fourth link quality.

In one configuration, the first base station and the second base station are a single base station. In one configuration, one of the first potential relay UE and the second potential relay UE may be selected based on a highest ranking of the first potential relay UE and the second potential relay UE. In one configuration, the ranking includes combining the first link quality and the second link quality by applying a first weighting factor to the first link quality and applying a second weighting factor to the second link quality. In one configuration, the first weighting factor and the second weighting factor are fixed values. In one configuration, the first weighting factor and the second weighting factor are preconfigured in the remote UE.

In one configuration, the remote UE may further include means for receiving information indicating at least one of the first weighting factor or the second weighting factor from a serving base station. The information may indicate the at least one of the first weighting factor or the second weighting factor is received in a SIB from the serving base station.

In one configuration, the information indicating the at least one of the first weighting factor or the second weighting factor is received as a dedicated RRC signaling from the serving base station.

In one configuration, the remote UE may further include means for receiving information indicating at least one of the first weighting factor or the second weighting factor from one of the first potential relay UE or the second potential relay UE as a part of a PC5 message.

In one configuration, ranking further includes selecting a minimum of the first link quality and the second link quality. In one configuration, the ranking is based on a linear average of the first link quality and the second link quality. In one configuration, the relay UE further includes means for transmitting a measurement report to the first base station. The measurement report including at least one of the first link quality and the second link quality.

In one configuration, the relay UE may further include means for receiving information from the first based station indicating at least one of the first potential relay UE or the second potential relay UE. The received information being based on the transmitted measurement report.

In one configuration, the relay UE may further include means for connecting to one of the first potential relay UE or the second potential relay UE based on the received information.

In one configuration, the relay UE may further include means for informing the first base station when at least one of the remote UE is successful at connecting to the one of the first potential relay UE or the second potential relay UE, or the remote UE has failed to connect to the relay UE.

In one configuration, the relay UE may further include means for transitioning from an RRC connected state to an RRC idle state with respect to a serving base station upon successfully connecting to one of the first potential relay UE or the second potential relay UE.

In some examples, the aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a remote user equipment (UE) composing:

determining a first link quality, the first link quality indicating a link quality of a first link between a first potential relay UE and the remote UE;

determining a second link quality, the second link quality indicating a link quality of a second link between the first potential relay UE and a first base station;

ranking the first potential relay UE relative to a second potential relay UE, the ranking of the first potential relay UE based on a combination of the first link quality and the second link quality, wherein the combination of the first link quality and the second link quality reduces total resource usage; and selecting one of the first potential relay UE and the second potential relay UE for a relay connection based on the ranking of the first potential relay UE relative to the second potential relay UE.

2. The method of claim 1, further comprising:

receiving a first PC5 message from the first potential relay UE, the first link quality being determined based on the received first PC5 message; and receiving a second PC5 message from the first potential relay UE, the second PC5 message comprising information indicating the second link quality.

3. The method of claim 2, wherein the first PC5 message and the second PC5 message are the same PC5 message.

4. The method of claim 2, wherein the first link quality of the first link is determined by determining at least one of a reference signal received power (RSRP), a reference signal received quality (RSRQ), a signal-to-noise ratio (SNR), or signal-to-interference-plus noise ratio (SINR) of the first PC5 message.

5. The method of claim 2, wherein the second link quality is a function of at least one of a reference signal received power (RSRP), a reference signal received quality (RSRQ), a signal-to-noise ratio (SNR), or a signal-to-interference-plus-noise ratio (SINR) of the second link.

6. The method of claim 1, further comprising:

determining a third link quality, the third link quality indicating a link quality of a third link between the second potential relay UE and the remote UE; and determining a fourth link quality, the fourth link quality indicating a link quality of a fourth link between the second potential relay UE and a second base station, wherein the first potential relay UE is ranked relative to the second potential relay UE further based on a combination of the third link quality and the fourth link quality.

7. The method of claim 6, further comprising:

receiving a third PC5 message from the second potential relay UE, the third link quality being determined based on the received third PC5 message; and receiving a fourth PC5 message from the second potential relay UE, the fourth PC5 message comprising information indicating the fourth link quality.

8. The method of claim 6, wherein the first base station and the second base station comprise a single base station.

9. The method of claim 1, wherein one of the first potential relay UE and the second potential relay UE is selected based on a highest ranking of the first potential relay UE and the second potential relay UE.

10. The method of claim 1, wherein the ranking comprises combining the first link quality and the second link quality by applying a first weighting factor to the first link quality and applying a second weighting factor to the second link quality.

11. The method of claim 10, wherein the first weighting factor and the second weighting factor are fixed values.

12. The method of claim 10, wherein the first weighting factor and the second weighting factor are preconfigured in the remote UE.

13. The method of claim 10, further comprising receiving information indicating at least one of the first weighting factor or the second weighting factor from a serving base station.

14. The method of claim 13, wherein the information indicating the at least one of the first weighting factor or the second weighting factor is received in a system information block (SIB) from the serving base station.

15. The method of claim 13, wherein the information indicating the at least one of the first weighting factor or the second weighting factor is received as a dedicated radio resource control (RRC) signaling from the serving base station.

16. The method of claim 10, further comprising receiving information indicating at least one of the first weighting factor or the second weighting factor from one of the first potential relay UE or the second potential relay UE as a part of a PC5 message.

17. The method of claim 10, wherein the ranking further comprises selecting a minimum of the first link quality and the second link quality.

18. The method of claim 10, wherein the ranking is based on a linear average of the first link quality and the second link quality.

19. The method of claim 1, further comprising transmitting a measurement report to the first base station, the measurement report including at least one of the first link quality and the second link quality.

20. The method of claim 19, further comprising receiving information from the first based station indicating at least one of the first potential relay UE or the second potential relay UE, the received information being based on the transmitted measurement report.

21. The method of claim 20, further comprising:

connecting to one of the first potential relay UE or the second potential relay UE based on the received information; and informing the first base station when at least one of the remote UE is successful at connecting to the one of the first potential relay UE or the second potential relay UE, or the remote UE has failed to connect to the relay UE.

22. The method of claim 20, further comprising transitioning from a radio resource control (RRC) connected state to an RRC idle state with respect to a serving base station upon successfully connecting to one of the first potential relay UE or the second potential relay UE.

23. The method of claim 1, wherein the first link quality and the second link quality do not include measures of signal power.

24. An apparatus for wireless communication, the apparatus being a remote user equipment (UE), comprising:

a memory; and at least one processor coupled to the memory and configured to:

determine a first link quality, the first link quality indicating a link quality of a first link between a first potential relay UE and the remote UE;

determine a second link quality, the second link quality indicating a link quality of a second link between the first potential relay UE and a first base station;

rank the first potential relay UE relative to a second potential relay UE, the ranking of the first potential relay UE based on a combination of the first link quality and the second link quality, wherein the combination of the first link quality and the second link quality reduces total resource usage; and select one of the first potential relay UE and the second potential relay UE for a relay connection based on the ranking of the first potential relay UE relative to the second potential relay UE.

25. The apparatus of claim 24, wherein the at least one processor is further configured to:

receive a first PC5 message from the first potential relay UE, The first link quality being determined based on the received first PC5 message; and receive a second PC5 message from the first potential relay UE, the second PC5 message comprising information indicating the second link quality.

26. The apparatus of claim 25, wherein the first PC5 message and the second PC5 message are the same PC5 message.

27. The apparatus of claim 25, wherein the first link quality of the first link is determined by determining at least one of a reference signal received power (RSRP), a reference signal received quality (RSRQ), a signal-to-noise ratio (SNR), or signal-to-interference-plus noise ratio (SNR) of the first PC5 message.

28. The apparatus of claim 25, wherein the second link quality is a function of at least one of a reference signal received power (RSRP), a reference signal received quality (RSRQ), a signal-to-noise ratio (SNR), or a signal-to-interference-plus-noise ratio (SNR) of the second link.

29. The apparatus of claim 24, wherein the at least one processor is further configured to:

determine a third link quality, the third link quality indicating a link quality of a third link between the second potential relay UE and the remote UE; and determine a fourth link quality, the fourth link quality indicating a link quality of a fourth link between the second potential relay UE and a second base station, wherein the first potential relay UE is ranked relative to the second potential relay UE further based on a combination of the third link quality and the fourth link quality.

30. The apparatus of claim 29, wherein the at least one processor is further configured to:

receive a third PC5 message from the second potential relay UE, the third link quality being determined based on the received third PC5 message; and receive a fourth PC5 message from the second potential relay UE, the fourth PC5 message comprising information indicating the fourth link quality.

31. The apparatus of claim 29, wherein the first base station and the second base station comprise a single base station.

32. The apparatus of claim 24, wherein one of the first potential relay UE and the second potential relay UE is selected based on a highest ranking of the first potential relay UE and the second potential relay UE.

33. The apparatus of claim 24, wherein the at least one processor is further configured to rank by combining the first link quality and the second link quality by applying a first weighting factor to the first link quality and applying a second weighting factor to the second link quality.

34. The apparatus of claim 33, wherein the first weighting factor and the second weighting factor are fixed values.

35. The apparatus of claim 33, wherein the first weighting factor and the second weighting factor are preconfigured in the remote UE.

36. The apparatus of claim 33, wherein the at least one processor is further configured to receive information indicating at least one of the first weighting factor or the second weighting factor from a serving base station.

37. The apparatus of claim 36, wherein the information indicating the at least one of the first weighting factor or the second weighting factor is received in a system information block (SIB) from the serving base station.

38. The apparatus of claim 36, wherein the information indicating the at least one of the first weighting factor or the second weighting factor is received as a dedicated radio resource control (RRC) signaling from the serving base station.

39. The apparatus of claim 33, wherein the at least one processor is further configured to receive information indicating at least one of the first weighting factor or the second weighting factor from one of the first potential relay UE or the second potential relay UE as a part of a PC5 message.

40. An apparatus for wireless communication, the apparatus being a remote user equipment (UE), comprising:

means for determining a first link quality, the first link quality indicating a link quality of a first link between a first potential relay UE and the remote LTE;

means for determining a second link quality, the second link quality indicating a link quality of a second link between the first potential relay UE and a first base station;

means for ranking the first potential relay UE relative to a second potential relay UE, the ranking of the first potential relay UE based on a combination of the first link quality and the second link quality, wherein the combination of the first link quality and the second link quality reduces total resource usage; and means for selecting one of the first potential relay UE and the second potential relay UE for a relay connection based on the ranking of the first potential relay UE relative to the second potential relay UE.

41. A non-transistory computer-readable medium storing computer-executable code for wireless communication in a remote user equipment (UE), comprising code to:

determine a first link quality, the first link quality indicating a link quality of a first link between a first potential relay UE and the remote UE;

determine a second link quality, the second link quality indicating a link quality of a second link between the first potential relay UE and a first base station;

rank the first potential relay UE relative to a second potential relay UE, the ranking of the first potential relay UE based on a combination of the first link quality and the second link quality, wherein the combination of the first link quality and the second link quality reduces total resource usage; and select one of the first potential relay UE and the second potential relay UE for a relay connection based on the ranking of the first potential relay UE relative to the second potential relay UE.

* * * * *